US007016105B2

(12) United States Patent
Balland et al.

(10) Patent No.: US 7,016,105 B2
(45) Date of Patent: Mar. 21, 2006

(54) OPTICAL AMPLIFICATION DEVICE WITH AUTOMATIC GAIN CONTROL

(75) Inventors: Guy Balland, Ste Genevieve des Bois (FR); Alice Michaud, Paris (FR); Emmanuel Rossi, Paris (FR); Frank Bruyere, Paris (FR); Jacques Pochet, Bretigny sur Orge (FR); Christophe Trouiller, Montrouge (FR)

(73) Assignee: Alcatel, Paris (FR)

( * ) Notice: Subject to any disclaimer, the term of this patent is extended or adjusted under 35 U.S.C. 154(b) by 257 days.

(21) Appl. No.: 10/636,553

(22) Filed: Aug. 8, 2003

(65) Prior Publication Data
US 2004/0027651 A1    Feb. 12, 2004

(30) Foreign Application Priority Data
Aug. 9, 2002  (FR) .................................. 02 10141

(51) Int. Cl.
*H04B 10/12*  (2006.01)
(52) U.S. Cl. ................ 359/337.1; 359/337.12
(58) Field of Classification Search .......... 359/337.12, 359/337.13, 341.41, 341.42, 337.1
See application file for complete search history.

(56) References Cited

U.S. PATENT DOCUMENTS 6,359,726 B1 *  3/2002  Onaka et al. ............ 359/337.1
6,400,479 B1    6/2002  Zhou et al.
6,529,319 B1 *  3/2003  Youn et al. ............ 359/341.41

FOREIGN PATENT DOCUMENTS

EP    0975103 A1    1/2000
EP    1033834 A2    9/2000

* cited by examiner

*Primary Examiner*—Mark Hellner
(74) *Attorney, Agent, or Firm*—Sughrue Mion, PLLC

(57) ABSTRACT

A method of automatic gain control for use in an optical amplification device comprising a variable optical attenuator and an optical amplifier connected downstream of the optical attenuator includes the steps of measuring the power at the input of the amplification device, determining the number of channels at the input of the amplification device as a function of the measured power knowing the attenuation value of a span upstream of the device, and modifying the gain of the amplifier as a function of the number of channels determined in this way.

11 Claims, 4 Drawing Sheets

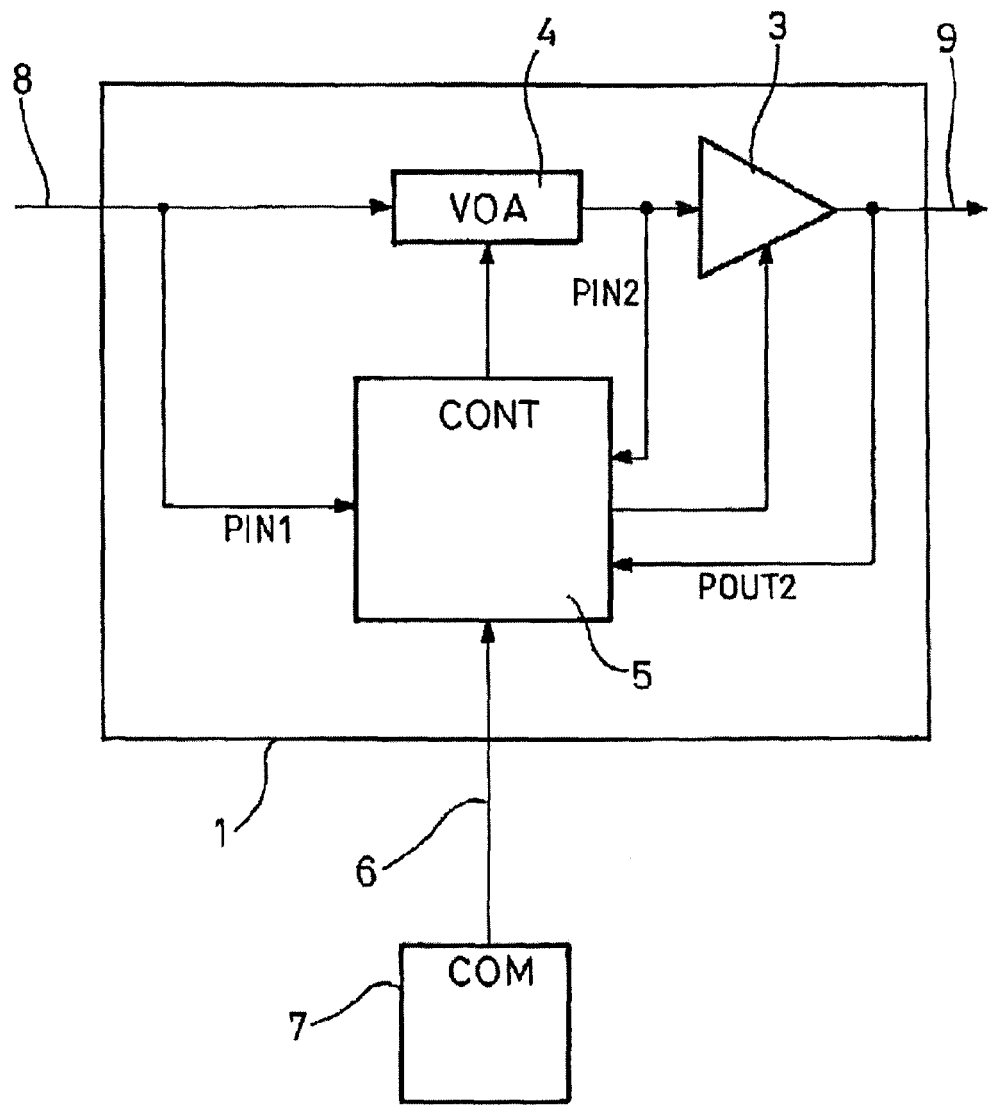
FIG_1

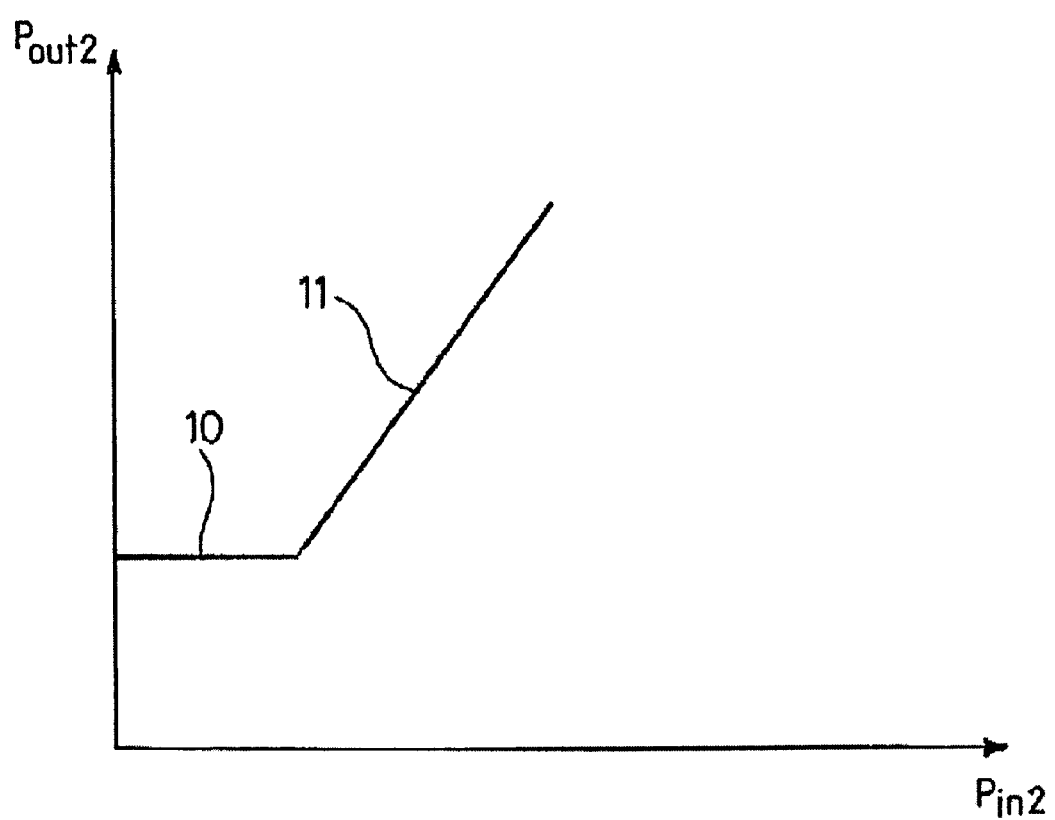

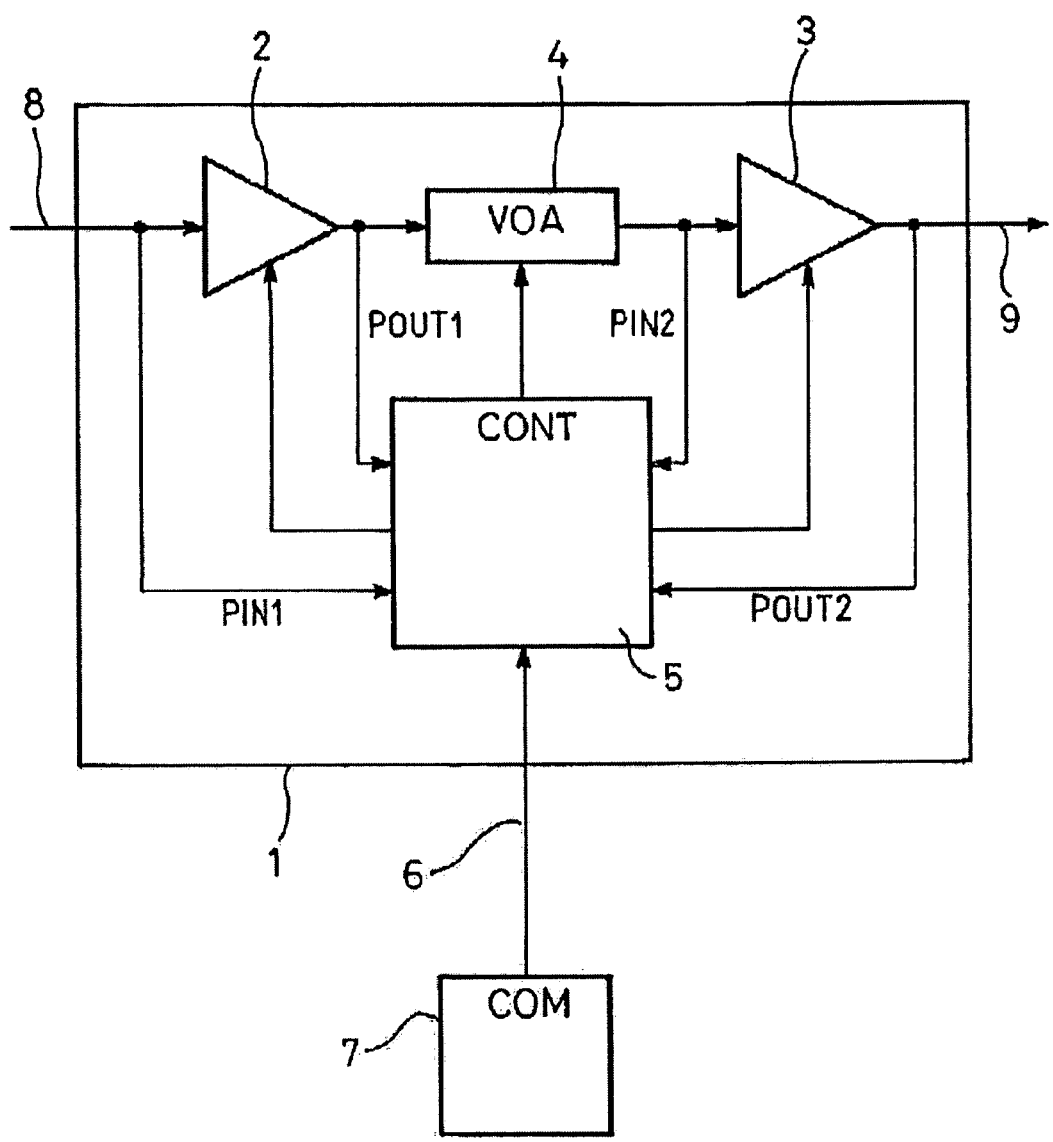
FIG_3

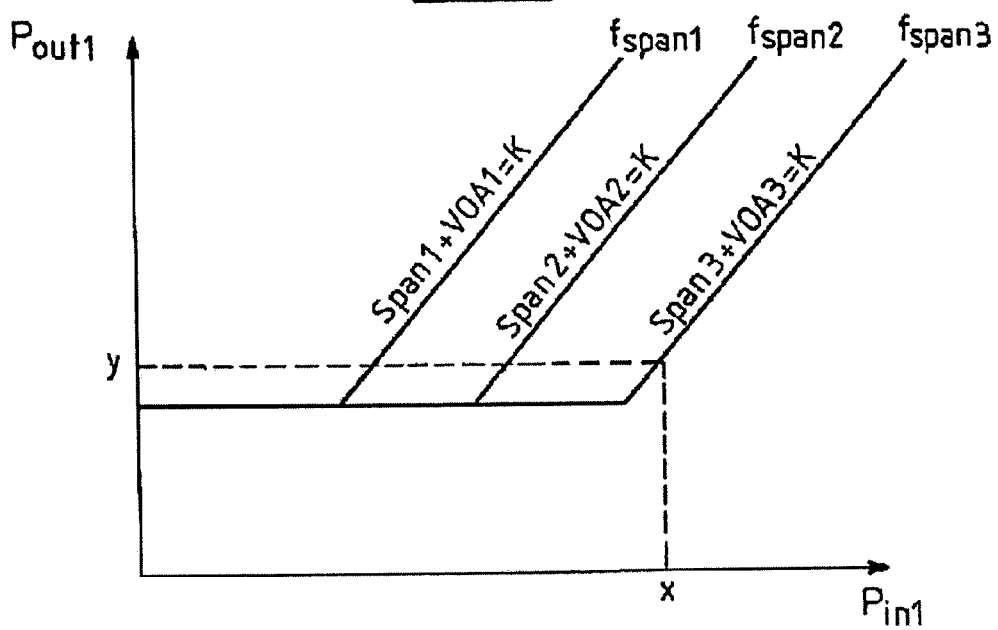
FIG_4
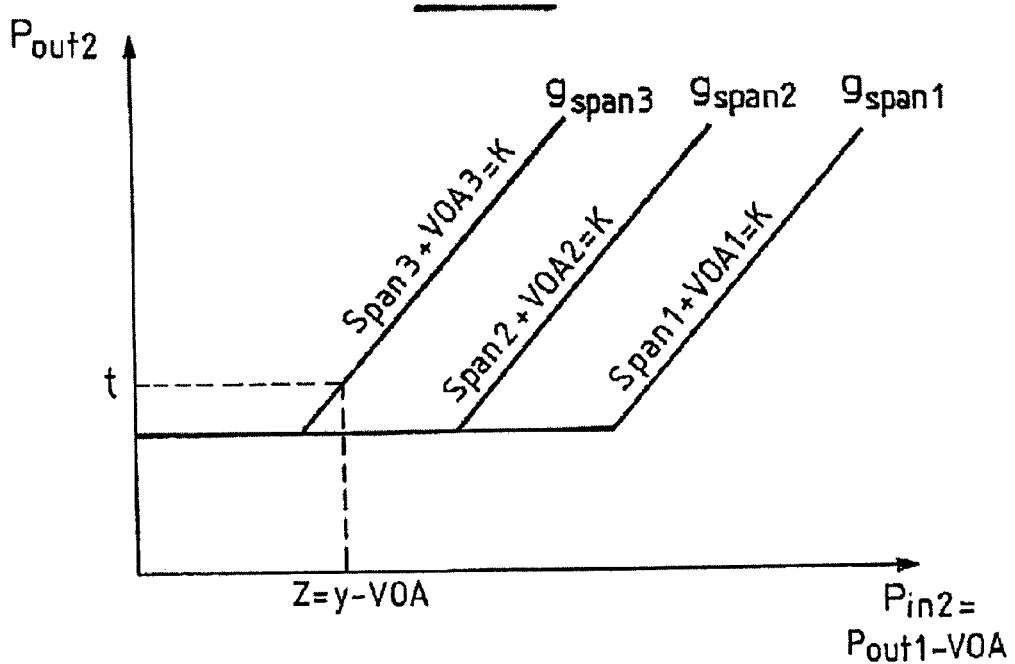
FIG_5

OPTICAL AMPLIFICATION DEVICE WITH AUTOMATIC GAIN CONTROL

CROSS-REFERENCE TO RELATED APPLICATIONS

This application is based on French Patent Application No. 02 10 141 filed Aug. 9, 2002, the disclosure of which is hereby incorporated by reference thereto in its entirety, and the priority of which is hereby claimed under 35 U.S.C. §119.

BACKGROUND OF THE INVENTION

1. Field of the Invention

The invention relates to optical amplification devices, and more particularly to optical amplification devices with uniform gain intended to be used in wavelength division multiplex optical fiber transmission systems. The amplifier devices are used at regular intervals to compensate the loss on the line. The amplifier devices are preferably identical over the whole of the connection and, for a given input power, preferably have a gain that is as flat as possible over the whole of the wavelength range used in the transmission system.

2. Description of the Prior Art

The gain of an amplifier device differs as a function of the wavelength of the signal to be amplified. In a network including multiple amplifiers, the gain differences between the various frequencies accumulate. Some frequency channels are therefore penalized. To provide a good quality of service for the penalized channels, a first solution is to move the successive amplifiers closer together. A greater number of amplifiers is then used and the cost of the network is consequently high.

Techniques for obtaining a uniform gain over the frequency spectrum from 1530 to 1630 nanometres are known in the art. Using gain equalization filters, modifying the doping profile of the fiber, or using fiber claddings of specific materials make the gain uniform to within 1 dB over the 1530–1560 nm spectrum. However, these techniques can achieve this kind of gain value only for a nominal input power. If the input power deviates from the nominal value, the gain uniformity falls off rapidly. Factors that vary the input power of an amplification device include aging or repair of the fibers, which generates interamplifier attenuation, a change to the network topology upstream of the amplification device, a change to the number of input channels of the amplification device, or a break in the fiber on the upstream side of an optical add and drop multiplexer.

An optical amplification device described in the document U.S. Pat. No. 6,257,329 comprises an optical amplifier, a variable optical attenuator (VOA) at the input of the optical amplifier, and a controller (CONT) controlling the variable optical attenuator and the optical amplifier. The controller is connected to a high-speed information network (IN) so that each node of the network can store the topology of the network. The high-speed information network sends the controller data concerning the operating parameters of the network, such as the interamplifier attenuation, also known as the span attenuation, and simply referred to as span hereinafter. The controller monitors in particular the input power (PIN) and the output power (POUT) of the amplifier.

A variation of the interamplifier attenuation or a modification of the network topology upstream of the optical amplifier (with no change in the number of channels) is declared to the controller by the information network (IN). The controller then knows the magnitude of the input power variation. The controller imposes variable optical attenuator corrections aimed at maintaining the power at the input of the optical amplifier at its nominal value. The optical amplifier therefore provides an output power, a noise factor, and a uniform gain that are approximately constant. The high-speed information network reports to the controller any modification to the assignment or the number of channels at the input of the optical amplifier. The controller then acts on the optical amplifier to maintain its gain constant.

The above optical amplification device and its method of operation have drawbacks. The control method is slow. It is dependent on information transmitted to the controller by the high-speed information network. In the event of a sudden change to the number of channels, resulting for example from accidental cutting of the optical fiber or failure of the optical add and drop multiplexer (and thus inherently unpredictable), correction of the optical amplifier by the controller is possible only after receiving information sent by the high-speed information network. The optical amplifier therefore functions with an input power differing greatly from its nominal power for a time period exceeding several hundred milliseconds. All of the optical amplifiers for which the number of channels has been modified accumulate a gain error during this time period. This causes transitory degradation of service. The controller waits for confirmation from the high-speed information network that the variation is caused by a change in the number of channels before applying a correction to the variable optical attenuator.

Moreover, the reduction in the number of channels at the input of the optical attenuator implies a reduction in the power at the input of the amplification device. For example, there is an input power drop of 15 dB on changing from 32 channels to one channel at the input of the above kind of optical amplification device. Maintaining the gain of the optical amplifier uniform in the event of this kind of power reduction degrades the noise factor (NF), the optical signal to noise ratio (OSNR) of the optical amplifier, and the uniformity of the gain.

Moreover, once the variable optical attenuator has applied the correction, the variable optical attenuator maintains a constant power at the input of the optical amplifier. This degrades the signal/noise ratio at the output of the amplifier and occurs in particular if the variable optical attenuator must reduce the power ahead of the input of the optical amplifier because the signal/noise ratio S/B (expressed in dB) obeys a law of the type S/B=PIN−Nf+C (where PIN is the power in dBm at the input of the amplifier, Nf is the external noise factor, and C is a constant). This implies moving the successive amplifier devices closer together, with an associated cost increase.

There is therefore a need for a method of operating an amplifier device removing one or more of the above drawbacks.

SUMMARY OF THE INVENTION

The invention consists in a method of managing a first optical amplification device for a wavelength division multiplex optical fiber transmission system, the first amplification device being disposed to receive a multiplex signal formed of a plurality of channels and comprising a variable optical attenuator and a first optical amplifier connected downstream of the optical attenuator, which method includes the steps of:

measuring the power of the signal received at the input of the first amplification device, continuously controlling the gain of the first amplifier as a function of the measured power in accordance with an amplification curve adapted to take account of variations of the measured power caused only by variations in the number of channels present at the input of the first amplification device, determining the optical attenuation AttSpan between the first optical amplification device and a second optical amplification device connected upstream of the first optical amplification device, and satisfying the equation AttSpan+AttVOA=K by controlling the attenuation value AttVOA of the variable optical attenuator, where AttSpan is the attenuation in decibels between the amplification devices, AttVOA is the attenuation in decibels of the optical attenuator of the first optical device, and K is a predetermined constant.

As a general rule, the number of channels to be amplified by each amplification device in transmission networks and systems is known. The controller can therefore find out the number of channels present at the input of the first amplification device from an information network. In this case, knowing that the optical power per channel is a given, is constant, and also can be determined, the optical attenuation AttSpan is easy to calculate as a function of the value of the power of the signal received by the first device and the known number of channels.

The invention is described in more detail next with reference to the drawings.

BRIEF DESCRIPTION OF THE DRAWINGS

FIG. 1 is a diagram showing the structure of an optical amplification device employing the invention.

FIG. 2 is an amplification curve of an amplifier of the FIG. 1 device.

FIG. 3 is a diagram showing the structure of another optical amplification device using the invention.

FIG. 4 is an amplification curve of an input amplifier of the FIG. 3 device.

FIG. 5 is an amplification curve of an output amplifier of the FIG. 3 device.

DETAILED DESCRIPTION OF THE PREFERRED EMBODIMENTS

The invention proposes to carry out a power measurement at the input of an optical amplification device provided with a variable attenuator and an optical amplifier. The number of channels at the input is determined as a function of the measured power. The value of the gain of the amplifier is modified as a function of the number of channels. Accordingly, in the event of a sudden variation in the number of channels upstream of the optical amplification device, the device adapts rapidly to the input power variation to prevent transitory transmission problems. Hereinafter, upstream and downstream are defined relative to the transmission direction on the optical network.

FIG. 1 shows the structure of a first embodiment of an optical amplification device adapted to implement the invention. The device includes a variable optical attenuator 4 whose input is connected to an optical fiber 8 or a communication network. The input of an optical amplifier 3 is connected downstream of the output of the variable optical attenuator 4. The output of the optical amplifier 3 is connected to an optical fiber 9 of the communication network.

The optical amplification device 1 also includes a controller 5 adapted to control the variable optical attenuator 4 and the gain of the optical amplifier 3. The controller 5 is therefore connected to the variable optical attenuator 4 and the optical amplifier 3. The controller 5 also measures the optical power Pin1 at the input of the variable optical attenuator 4 and the optical powers Pin2 and Pout2 at the input and the output of the optical amplifier 3. The controller 5 is preferably also connected to a control unit 7 via a communication network 6.

The controller adjusts the value AttVOA (in dB) of the attenuation of the variable optical attenuator 4, on the basis of the value AttSpan received via the network 6 or measured locally, so as to satisfy the equation AttVOA+AttSpan=K.

The controller measures continuously the power at the input of the optical amplification device 1, i.e. the power Pin1 in the FIG. 1 example. The number Nch of channels received at the input of the optical amplification device 1 is a function of the measured input power Pin1 (in dBm) and the attenuation Attspan of the span (in dB, and assumed to be known), in accordance with an equation known in the art of the following type:

$$10*\ln(Nch)=Pin1+AttSpan+constant,$$

applicable to spectra that are quasi-uniform in wavelength. The controller 5 then modifies the value of the gain of the optical amplifier 3 as a function of Pin1, which constitutes a measure of the number of channels (on the highly probable assumption that the attenuation Attspan known to the controller is always accurate).

Thus the optical amplification device can rapidly adapt the gain of the optical amplifier 3 without having to wait for confirmation of the change in the number of channels via an optical communication link. This avoids problems of transitory transmission in the event of a change in the number of channels at the input of the optical amplification device. The most frequent situation in which the number of channels at the input is modified is that of fiber breaks upstream of an optical add and drop multiplexer upstream of the optical amplification device 1. The number of channels can then be reduced suddenly, which causes a drop in the input power Pin1 of the optical amplification device 1. The amplifier 3 is then adjusted to compensate the reduction in the input power Pin1 and to maintain the power per channel unchanged compared to the power per channel before the fiber was broken. All of the downstream amplifiers carry out this same gain adjustment operation through a daisychain effect. Apart from its fast reaction, this device requires no high-speed communication network, which reduces the cost and the overall complexity of the communication network.

If the attenuation Attspan known to the controller had been inaccurate, a new value of AttSpan would subsequently be transmitted by the network 6 anyway. The attenuation AttVOA of the variable optical attenuator 4 would then be adjusted to satisfy the equation AttVOA+AttSpan=K. This would lead to a variation in the input power Pin1 and immediate adjustment of the gain, which would re-establish the ideal operating state (on the highly probable assumption that modifications to the number of channels do not occur simultaneously).

FIG. 2 is an amplification curve of the optical amplifier 3 showing the variation of its output power Pout2 (in dBm) as a function of the input power Pin2 (in dBm). The gain G of the optical amplifier 3 is a linear value defined by the equation:

$$G = Pout2/Pin2.$$

As shown in FIG. 2, the gain preferably has a decreasing first value when the input power increases over a first input power range and a substantially constant second value over a second input power range. The input powers of the first range are less than the input powers of the second range and the gain over the first range is higher than the gain over the second range. Thus the first range corresponds to the portion 10 of the curve and the second range corresponds to the portion 11.

Accordingly, in the event of variation of the input power in the second range, the gain remains substantially constant in the absence of determination of a change in the span attenuation. The power per channel at the output of the optical amplifier 3 then remains substantially constant.

If the input power falls from the second range to the first range, the gain increases. The output power is therefore at a sufficient value to maintain a good signal to noise ratio if the input power falls. In this case the power per channel is no longer maintained constant, and increases. As the figure shows, a gain can be provided over the first range such that the output power Pout2 of the amplifier is substantially constant over that range.

FIG. 3 shows the structure of a second embodiment of an optical amplification device 1 adapted to implement the invention. The device 1 includes an optical amplifier 2 whose input is connected to an optical fiber 8. The input of a variable optical attenuator 4 is connected downstream of the output of the optical amplifier 2. The input of an optical amplifier 3 is connected downstream of the output of the variable optical attenuator 4. The output of the optical amplifier 3 is connected to an optical fiber 9.

The optical amplification device 1 comprises a controller 5 similar to the FIG. 1 controller. The controller 5 is therefore able to control the variable optical attenuator 4 and the optical amplifiers 2 and 3. The controller 5 is therefore connected to the variable optical attenuator 4 and to the optical amplifiers 2 and 3. The controller 5 measures the optical power Pin1 at the input of the optical amplifier 2, the optical power Pout1 at the output of the optical amplifier 2, the power Pin2 at the input of the optical amplifier 3, and the power Pout2 at the output of the optical amplifier 3. The controller 5 is preferably also connected to a control unit 7 in a similar manner to that shown in FIG. 1.

Placing the variable optical attenuator 4 downstream of the optical amplifier 2 reduces the signal losses at the input of the optical amplification device 1 because the signal applied to the input of the optical amplification device 1 is amplified by the optical amplifier 2 before it is fed to the variable optical attenuator 4. The inherent signal loss of a variable optical attenuator 4 is therefore incurred only after a preceding amplification stage. The optical amplification device 1 is therefore adapted to amplify signals having lower input powers, which makes it possible to increase the distances between the optical amplification devices 1 of the transmission network. The amplification of the optical amplifier 2 is preferably such that the power Pin1 is at least 1 dB greater than the power Pin2. This improves the signal to noise ratio of the optical amplifier device 1 in the same ratio.

Using two optical amplifiers 2 and 3 can therefore maintain the spectral uniformity of the gain of the optical amplifier 1. This is because, if the controller detects a variation in the attenuation of the span upstream of the amplification device 1 (variation of Pin1 with no variation in the number of channels), the value of the variable optical attenuator 4 is modified to satisfy the condition:

$$AttVOA + Span = Constant,$$

which ensures the spectral uniformity of the gain at the output of the optical amplifier 2; in other words, the gain uniformity error of the amplifier 2 is exactly compensated by the gain uniformity error of the amplifier 3, thus imparting optimum uniformity to the whole of the amplification device 1.

Amplification curves used with advantage in the optical amplifiers 2 and 3 are described next with reference to FIGS. 4 and 5. The curves show the variation of the output powers Pout2 and Pout1 (in dBm) of the optical amplifiers 2 and 3, respectively, as a function of the powers Pin2 and Pin1 (in dBm) received at their respective inputs. The controller can modify the gains of the optical amplifiers 2 and 3 as a function of the number of channels at the input of the optical amplification device 1. The (linear) gains of the amplifiers 2 and 3 are respectively defined by the equations:

$$F = Pout1/Pin1 \text{ and } G = Pout2/Pin2.$$

The FIGS. 4 and 5 amplification curves $f_i$ and $g_i$ preferably satisfy the following rules:

1) For a given power at the output of the optical amplification device 1, $f_{span1}(Pin1)$ is greater than or equal to $f_{span2}(Pin1)$ over a given range of Pin1 if span1>span2, span1 and span2 being two span attenuations and $f_{span1}$ and $f_{span2}$ being amplification curves. The foregoing equation is preferably verified over all of the usable input power range Pin1 common to the various curves. The FIG. 4 curves are denoted $f_{span}$ with a suffix corresponding to the span preceding the amplifier 2.

2) For a given power at the input of the optical amplification device 1, $g_{span1}(Pin1)$ is less than or equal to $g_{span2}(Pin1)$ over a given range of Pin1, if span1≧span2, span1 and span2 being two span attenuations and $g_{span1}$ and $g_{span2}$ being amplification curves. The above equation is preferably verified for all of the usable input power range Pin1 common to the various curves. The FIG. 5 curves are identified by references $g_{span}$ with a suffix corresponding to the span preceding the amplifier 2. Using amplification curves of the above kind maintains a uniform gain on the various channels, even in the event of a change to the number of channels.

The gain curve of the optical amplifier 2 preferably shows a decreasing gain when the power Pin1 increases over a first range. The gain curve of the optical amplifier 2 likewise preferably shows a substantially constant gain over a second power range Pin1, the powers of the second range being greater than the powers of the first range. The gain over the first range is higher than the gain over the second range. As for the FIG. 2 gain curve, the first power range corresponds to a power Pout1 that is substantially constant and the second power range corresponds to a gain that is substantially constant.

The gain curve of the optical amplifier 3 preferably shows a decreasing gain when the power Pin2 increases over a first power range. The gain curve of the optical amplifier 3 likewise preferably shows a substantially constant gain over a second power range Pin2, the powers of the second range being higher than the powers of the first range. The gain over the first range is higher than the gain over the second range. As for the FIG. 2 gain curve, the first power range corresponds to a substantially constant power Pout2 and the second power range corresponds to a substantially constant gain.

The interamplifier attenuation upstream of the optical amplification device 1 is advantageously determined knowing the number of channels at the input of the optical amplification device 1 from an equation of the following type:

$$10*\ln(Nch)=Pin+AttSpan+constant,$$

which is applicable to spectra that are quasi-uniform in wavelength.

The interamplifier attenuation can be determined either by external components, such as the control unit 7, disposed upstream of the amplification device and supplying to the device 1 the attenuation value Attspan, or by the optical amplification device 1 itself as a function of the number of channels supplied by the information network 6. In this latter case, the optical amplification device 1 can determine the interamplifier attenuation by measuring Pin1 and then either by using a reference value of the output power of the upstream amplification device or by recovering the reference value via the network 6. This solution is easy to put into practice because the applicable number of channels is normally always available in a transmission system or network.

The interamplifier attenuation is then used to satisfy the following equation:

$$AttSpan+AttVOA=K,$$

in which AttSpan is the interamplifier attenuation (in dB), AttVOA is the attenuation (in dB) in the variable optical attenuator, and K is a constant. The controller modifies the value of AttVOA if a new value of AttSpan has been determined. This produces a gain curve of the optical amplification device 1 that is uniform over the various channels. Indeed, in the absence of a change in the number of channels, the power at the output of the variable optical attenuator is substantially constant. Consequently, the optical amplifier 3 has available during its normal operation a nominal input power for which its gain is uniform over the various channels.

In the absence of modification of the interamplifier attenuation, the variation of Pin1 is detected by 5 as a variation in the number of channels and the gain of 2 is adjusted instantaneously in accordance with the FIG. 4 curves. The gain of 3 is in turn adjusted on detecting a variation of Pin2 from the FIG. 5 curve. The power per channel is thus maintained constant over a high range of Pin1 and the total power is maintained constant over a low range of Pin1.

In the case of a modification of the interamplifier attenuation (as caused by aging or repair of the line fiber), it is possible, knowing for example the number of channels present at the input of 1 from COM (7), to adjust AttVOA automatically in accordance with the equation AttSpan+AttVOA=K, after which the amplifier is again under uniform gain conditions and ready to react to variation of Pin1 (i.e. to variation of the number of channels).

It is to be noted that a third option exists, which consists in combining the FIG. 1 solution with the FIG. 3 solution (variable optical attenuator at the input of the two-stage amplifier), in which case the interstage attenuation (AttIE) is fixed and set to a value such that AttSpan+AttVOA+AttIE=K.

What is claimed:

1. A method of managing a first optical amplification device for a wavelength division multiplex optical fiber transmission system, said first amplification device being disposed to receive a multiplex signal formed of a plurality of channels and comprising a variable optical attenuator and a first optical amplifier connected downstream of said optical attenuator, which method includes the steps of:

measuring the power of the signal received at the input of the first amplification device, continuously controlling the gain of said first amplifier as a function of the measured power in accordance with an amplification curve adapted to take account of variations of said measured power caused only by variations in the number of channels present at the input of the first amplification device, determining the optical attenuation AttSpan between the first optical amplification device and a second optical amplification device connected upstream of the first optical amplification device, and satisfying the equation AttSpan+AttVOA=K by controlling the attenuation value AttVOA of said variable optical attenuator, where AttSpan is the attenuation in decibels between said amplification devices, AttVOA is the attenuation in decibels of said optical attenuator of said first optical device, and K is a predetermined constant.

2. The method claimed in claim 1 wherein the number of channels present at the input of said first amplification device is known from an information network and said optical attenuation AttSpan is calculated as a function of the value of the power of the signal received by said first device and said known number of channels.

3. The method claimed in claim 1 wherein said amplifier has an amplification curve having a first segment in which the gain decreases as the input power increases for a first range of powers at its input and a second segment in which the gain is substantially constant for a second range of powers at its input, the powers of said first range being lower than the powers of said second range.

4. The method claimed in claim 1 wherein said first optical amplification device comprises a second optical amplifier connected upstream of said variable optical attenuator and said amplification curve of said first optical amplifier has a first segment in which the gain decreases as its input power increases for a first range of powers at its input and a second segment in which the gain is substantially constant for a second range of powers at its input, the powers of said second range of powers being higher than the powers of said first range, and in which method said second optical amplifier is controlled to have a gain curve having a first segment in which the gain decreases if its input power increases for a first range of powers at its input and a second segment in which the gain is substantially constant for a second range of powers at its input, the powers of said second range of powers being higher than the powers of said first range.

5. The method claimed in claim 4 wherein said amplification curve of an amplifier represents output power variations as a function of the power received at its input and:

said first optical amplifier has amplification curves such that, for span1≧span2, $g_{span1}(Pin2) \geq g_{span2}(Pin2)$, at least over a range of values of Pin2, $g_{span1}$ and $g_{span2}$ being amplification curves of said first amplifier for respective span attenuations span1 and span2, and Pin2 being a power at the input of said first amplifier, said second optical amplifier has amplification curves such that, for span1≧span2, $f_{span1}(Pin1) \geq f_{span2}(Pin1)$, at least over a range of values of Pin1, $f_{span1}$ and $f_{span2}$ being amplification curves of said second amplifier for respective span attenuations span1 and span2, and Pin1 being a power at the input of said second amplifier.

6. A method of managing a first optical amplification device for a wavelength division multiplex optical fiber transmission system, said first amplification device receiving at its input a multiplex signal formed of a plurality of channels and comprising a variable optical attenuator and a first optical amplifier connected downstream of said optical attenuator, which method includes the steps of:

measuring the power of the signal received at said input of the first amplification device, controlling the gain of said first amplifier as a function of the measured power such that the gain of said amplifier is changed when the measured signal power indicates a variation in the number of channels present at the input of the first amplification device, determining the optical attenuation AttSpan between the first optical amplification device and a second optical amplification device connected upstream of the first optical amplification device, and satisfying the equation AttSpan+AttVOA=K by controlling the attenuation value AttVOA of said variable optical attenuator, where AttSpan is the attenuation in decibels between said amplification devices, AttVOA is the attenuation in decibels of said optical attenuator of said first optical device, and K is a predetermined constant.

7. The method claimed in claim 6 wherein the number of channels present at the input of said first amplification device is known from an information network and said optical attenuation AttSpan is calculated as a function of the value of the power of the signal received by said first device and said known number of channels.

8. The method claimed in claim 6 wherein said amplifier has an amplification curve having a first segment in which the gain decreases as the input power increases for a first range of powers at its input and a second segment in which the gain is substantially constant for a second range of powers at its input, the powers of said first range being lower than the powers of said second range.

9. The method claimed in claim 6 wherein said first optical amplification device comprises a second optical amplifier connected upstream of said variable optical attenuator and said amplification curve of said first optical amplifier has a first segment in which the gain decreases as its input power increases for a first range of powers at its input and a second segment in which the gain is substantially constant for a second range of powers at its input, the powers of said second range of powers being higher than the powers of said first range, and in which method said second optical amplifier is controlled to have a gain curve having a first segment in which the gain decreases if its input power increases for a first range of powers at its input and a second segment in which the gain is substantially constant for a second range of powers at its input, the powers of said second range of powers being higher than the powers of said first range.

10. The method claimed in claim 9 wherein said amplification curve of an amplifier represents output power variations as a function of the power received at its input and:

said first optical amplifier has amplification curves such that, for span1$\geq$span2, $g_{span1}(Pin2) \geq g_{span2}(Pin2)$, at least over a range of values of Pin2, $g_{span1}$ and $g_{span2}$ being amplification curves of said first amplifier for respective span attenuations span1 and span2, and Pin2 being a power at the input of said first amplifier, said second optical amplifier has amplification curves such that, for span1$\geq$span2, $f_{span1}(Pin1) \geq f_{span2}(Pin1)$, at least over a range of values of Pin1, $f_{span1}$ and $f_{span2}$ being amplification curves of said second amplifier for respective span attenuations span1 and span2, and Pin1 being a power at the input of said second amplifier.

11. A method of managing a first optical amplification device for a wavelength division multiplex optical fiber transmission system, said first amplification device receiving at its input a multiplex signal formed of a plurality of channels and comprising a variable optical attenuator and a first optical amplifier connected downstream of said optical attenuator, which method includes the steps of:

measuring the power of the signal received at said input of the first amplification device, controlling the gain of said first amplifier as a function of the measured power such that an output power of said amplifier is a first function of an input power of said amplifier over a range of measured amplification device input powers corresponding to a first number of channels present at said input to said amplification device and is a second function of said input power of said amplifier over a range of measured amplification device input powers corresponding to a number of channels present at the input to said amplification device which is different from said first number, determining the optical attenuation AttSpan between the first optical amplification device and a second optical amplification device connected upstream of the first optical amplification device, and satisfying the equation AttSpan+AttVOA=K by controlling the attenuation value AttVOA of said variable optical attenuator, where AttSpan is the attenuation in decibels between said amplification devices, AttVOA is the attenuation in decibels of said optical attenuator of said first optical device, and K is a predetermined constant.

* * * * *